United States Patent Office 3,794,683
Patented Feb. 26, 1974

3,794,683
HALOCARBOXYLIC ACID ANILIDES
Gustav Gassner, Kelkheim, Taunus, Gerhard Horlein, Frankfurt am Main, and Hans Rochling, Altenhain, Taunus, Germany, assignors to Farbwerke Hoechst Aktiengesellschaft vormals Meister Lucius & Bruning, Frankfurt am Main, Germany
No Drawing. Filed Aug. 24, 1971, Ser. No. 174,564
Claims priority, application Germany, Aug. 26, 1970, P 20 42 300.1
Int. Cl. C07c 103/32
U.S. Cl. 260—562 B
4 Claims

ABSTRACT OF THE DISCLOSURE

The invention provides substituted halocarboxylic acid anilides of the general formula A

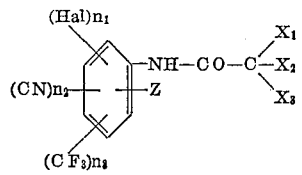

in which $X_1$ and $X_2$ stand for chlorine, fluorine or bromine, $X_3$ represents hydrogen, chlorine, fluorine, bromine or $CHCl_2$, Z means $NO_2$ or $CF_3$, Hal represents identical or different halogen atoms, preferably chlorine, bromine or fluorine, $n_1$ being zero or 1 or 2 or 3, $n_2$ being zero or 1 or 2, $n_3$ being zero or 1 or 2, and the sum of $n_1+n_2+n_3$ is an integer in the range of from 1 to 4. The novel compounds have a good herbicidal effect against a series of mono- and dicotyledons.

---

The present invention relates to substituted halocarboxylic acid anilides of the general formula A

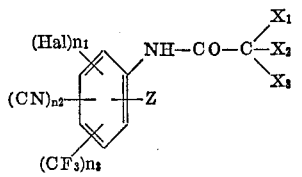

in which $X_1$ and $X_2$ stand for chlorine, fluorine or bromine, $X_3$ represents hydrogen, chlorine, fluorine, bromine or $CHCl_2$, Z means $NO_2$ or $CF_3$, Hal represents identical or different halogen atoms, preferably chlorine, bromine or fluorine, $n_1$ being zero or 1 or 2 or 3, $n_2$ being zero or 1 or 2, $n_3$ being zero or 1 or 2, and the sum of $n_1+n_2+n_3$ is an integer in the range of from 1 to 4.

The present invention also relates to a process for the preparation of halocarboxylic acid anilides of the general Formula A which comprises reacting in known manner, preferably in an inert solvent, correspondingly substituted anilines (a) with the corresponding halocarboxylic acid halides in the presence of a tertiary base or (b) with the corresponding halocarboxylic anhydrides in the presence of concentrated sulfuric acid or the respective halocarboxylic acid. If desired, the product obtained may be nitrated with potassium nitrate or nitric acid in sulfuric acid.

From among the compounds of the invention there are preferred those which carry a nitro group at the phenyl nucleus besides further substituents of the above definition, and a trifluoromethyl, trichloromethyl, or dichlorodifluoroethyl group in the acid radical, i.e. compounds in which the radical

of the general Formula A stands for $CCl_3$, $CF_3$, or $CF_2CHCl_2$.

The anilines used as starting material can be prepared by known methods described in literature.

Suitable anilines are, for example:
2,5-di-(trifluoromethyl)-4-nitroaniline
3,5-di-(trifluoromethyl)-2-nitroaniline
3,5-di-(trifluoromethyl)-aniline
3,5-di-(trifluoromehtyl)-4-nitroaniline
2,6-dichloro-4-nitroaniline
2-fluoro-5-chloro-4-nitroaniline
2,4,6-trichloro-3-nitroaniline
3,4,5-trichloro-2-nitroaniline
2,3,6-trichloro-4-nitroaniline
3,4,6-trichloro-aniline
3,4,6-trichloro-2-nitroaniline
2,3,6-trifluoro-4-nitroaniline
2,3,6-trifluoro-3-nitroaniline
2,4,6-tribromo-3-nitroaniline
4-cyano-2-nitroaniline
2-cyano-4-nitroaniline
2,4-dicyano-5-trifluoromethylaniline
2,6-dichloro-4-trifluoromethylaniline
2,3,6-trichloro-5-trifluoromethylaniline
2,6-dichloroaniline
3,4,5-trichloroaniline
2,4,6-trichloroaniline
2,4,5-trifluoroaniline
3,5-dicyanoaniline When the last mentioned anilines, which do not contain a nitro group are used, the acylated aniline may subsequently be nitrated.

As halocarboxylic acid halides, preferably halocarboxylic acid chlorides or fluorides, or halocarboxylic anhydrides there are used, for example, compounds in which the radical

stands for $CF_3$, $CCl_3$, $CBr_3$, $CClF_2$, $CClBr_2$, $CHCl_2$, $CHBr_2$, $CHF_2$, $CF_2CHCl_2$, $CFCl_2$ or $CFBr_2$, preferably $CF_3$, $CCl_3$ or $CF_2CHCl_2$.

The compounds of the general Formula A can be prepared in inert solvents, for example benzene, toluene, xylene, chloro-benzene, petroleum ether boiling at about 80–110° C., or carbon tetrachloride, in the presence of an about molar amount of a tertiary base, for example pyridine or triethylamine, by adding the corresponding halocarboxylic acid halide in an approximately molar amount, calculated on the aniline used. During the addition of the acid halide, the reaction mixture warms up so that cooling may be advantageous. In general, the reaction is carried out at a temperature in the range of from 20 to 120° C., preferably 40 to 80° C. After addition of the acid halide, the reaction mixture is stirred for a further 3 to 5 hours at 80–110° C.

Alternatively, the compounds of the invention can be prepared in the aforesaid inert solvents in the presence of catalytic amounts of concentrated sulfuric acid or the corresponding halocarboxylic acid, for example in an amount of 0.01 to 0.1 mole per mole of aniline used, by reacting the aniline with the corresponding halocarboxylic anhydrides. In this case, the reaction temperature should be in the range of from 80 to 140° C., preferably 110 to 140° C.

A further object of the present invention are herbicides characterized by a content of halocarboxylic acid anilides of the general Formula A.

It is known that anilides may have herbicidal properties. Propanil (3,4-dichloro-propion-anilide), (German Pat. No. 1,039,779, British Pat. No. 903,766), for example, is a commercially available herbicide. It was used in the following examples as comparative agent.

It has been found that the compounds of the invention exhibit an effect as pre-emergence herbicides that is surprising for the class of anilides and, for example, which is superior to that of propanil.

The compounds of the invention are especially effective, however, as post-emergence herbicides. In this case, too, the novel compounds are distinctly superior to propanil and dinoseb-acetate. A detailed description of the biological action of the compounds of the invention follows below.

The compounds of the invention can be used as herbicides in the form of wettable powders, emulsifiable concentrates, sprayable solutions, dusting powders or granules.

Wettable powders are preparations that can be uniformly dispersed in water and contain, besides an inert substance, a wetting agent, for example polyoxethylated alkylphenols, polyoxethylated oleyl- or stearylamines, alkyl- or alkylphenyl sulfonates and dispersing agents, for example the sodium salt of lignin-sulfonic acid, of 2,2'-dinaphthylmethane-6,6'-disulfonic acid, of dibutyl-naphthalene-sulfonic acid or sodium oleylmethyltauride.

Suitable grinding auxiliaries are inorganic or organic salts such as sodium sulfate, ammonium sulfate, sodium carbonate, sodium bicarbonate, sodium thiosulfate, sodium stearate or sodium acetate.

Emulsion concentrates are obtained by dissolving the active ingredient in an organic solvent, for example butanol, cyclohexanone, dimethylformamide, xylene or aromatic hydrocarbons having a higher boiling point. To obtain suspensions or emulsions in water having good properties, wetting agents as specified above are also added.

Dusting powders are obtained by grinding the active ingredients with finely divided, solid substances, for example talc, natural clays, pyrophillite or diatomaceous earths.

Spraying solutions commercially available as aerosol sprays contain the active ingredient dissolved in an organic solvent, and in addition thereto a propellant, for example a mixture of fluorohydrocarbons.

Granules can be produced by atomizing the active ingredient on to an absorptive, granulated inert material, or by applying concentrates of the active ingredient to the surface of a support, for example sand, kaolinite or a granulated inert material with the aid of an adhesive, for example polyvinyl alcohol, the sodium salt of polyacrylic acid, or mineral oils. Alternatively, suitable active ingredients may be made into granules, if desired in admixture with fertilizers, in the manner commonly used for the manufacture of granulated fertilizers.

The commercial herbicidal preparations contain varying concentrations of the active ingredients. In wettable powders the concentration of active ingredients varies, for example, from about 10 to 95%, the remainder being the above formulation additives. Emulsion concentrates contain about 10 to 80% of active ingredient, while dusting powders mostly contain 5 to 20% of active ingredient and sprayable solutions about 2 to 20%.

In the case of granules, the content of active ingredient partially depends on whether the active ingredient is liquid or solid and on the type of granulation auxiliary or filler used.

For application, the wettable powder or emulsifiable concentrate is diluted in usual manner with water. Dusts and granulated formulations as well as sprayable solutions are not diluted further with an inert substance before their application. The amount applied varies with the external conditions, such as temperature, humidity and the like. In general, about 0.015 to 0.25 gram and preferably about 0.03 to 0.12 gram of active ingredient per square meter are used.

The herbicides according to the present invention may be combined with other herbicides and soil insecticides. Known herbicides which may be combined with the novel compounds of the invention are, for example:

Urea derivatives: linuron, chloroxuron, monolinuron, fluometuron, diuron
Triazine derivatives: simazin, atrazin, ametryne, prometryne, desmetryne, methoprotryne;
Urazil derivatives: lenacil, bromacil;
Pyrazone derivating: 1-phenyl-4-amino-5-chloropyridazone (6);
Growth-promoting preparations: 2,4-dichlorophenoxy-acetic acid, 4-chloro-2-methylphenoxy-acetic acid, 2,4,5-trichlorophenoxyacetic acid, 4-chloro-2-methylphenoxy-butyric acid, 2,3,6-trichloro-benzoic acid;
Carbamic acid derivatives: barban, phenmediphan, triallate, diallate, vernolate and 2-chloroallyl-N,N-diethyl-dithiocarbamate, swep;
Dinitrophenol derivatives: dinitro-orthocresol, dinoseb, dinosebacetate;
Chlorinated aliphatic acids: trichloroacetic acid, dalapon;
Amides: diphenamide, N,N-diallyl-chloroacetamide;
Dipyridilium compounds: paraquat, biquat, morfamquat;
Anilides: N-(3,4-dichlorophenyl)-methacrylamide, propanil, solan, monalide, 2-chloro-2',6'-diethyl-N-(methoxymethyl)-acetanilide, propachlor;
Nitriles: dichlorbenil, ioxynil;
Other preparations: flurenol, 3,4-dichloropropionanilide, bensulide, monosodium methyl arsonate, 4-trifluoromethyl-2,4'-dinitrodiphenyl ether.

When the active ingredients according to the invention are mixed with fertilizers, preparations are obtained which simultaneously have a fertilizing and a herbicidal effect.

A wettable powder which is readily dispersible in water can be obtained by mixing 25 parts by weight of an active ingredient according to the invention,
64 parts by weight of kaolin-containing quartz as inert substance,
10 parts by weight of the potassium salt of lignin-sulfonic acid,
1 part by weight of sodium oleylmethyl tauride as wetting and dispersing agent, and grinding the mixture obtained in a disk attrition mill.

A dusting powder having good herbicidal properties can be obtained by mixing 10 parts by weight of an active ingredient according to the invention and
90 parts by weight of talcum as inert substance, and grinding the mixture obtained in a cross-beater mill.

An emulsifiable concentrate consists, for example, of 15 parts by weight of an active ingredient according to the invention
75 parts by weight of cyclohexanone as solvent and
10 parts by weight of nonyl(ethoxyl)$_{10}$ phenol as emulsifier.

The following examples illustrate the invention. The acylation of the aniline derivatives may be carried out either with a halocarboxylic acid chloride in the presence of a tertiary base with a halocarboxylic anhydride or in the presence of concentrated sulfuric acid or the corresponding halocarboxylic acid. Alternatively, an acylated aniline may be subsequently nitrated.

EXAMPLE 1

2,5-di-(trifluoromethyl)-4-nitro-($\alpha,\alpha$-difluoro-$\beta,\beta$-dichloro)-propionanilide

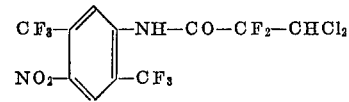

877 grams (3.2 moles) of 2-nitro-5-amino-hexafluoro-p-xylene (prepared by first chlorinating, then fluorinating and nitrating 2-chloro-p-xylene in the side chain and finally exchanging the ring chlorine atom for the amino group) were dissolved in 6.4 liters if dried toluene and 467 milliliters (3.36 moles) of triethyl amine were added. The mixture was heated at 80° C., the heating bath was removed when the indicated temperature had been reached and 664 grams (3.36 moles) of α,α-difluoro-β,β-dichloro-propionic acid chloride (obtained as described by G. Troilo and G. Gambaretto, Ann. Chim. 58 (1968), No. 1 pp. 25–31) were added dropwise. The reaction mixture was heated for 4 hours at 100° C., after cooling the formed hydrochloride was separated by filtration, the filtrate was concentrated and the residue was distilled without column under highly reduced pressure. Yield 1170 grams (84%) boiling point under 0.1 mm. Hg 136–140° C.

After distillation, the substance became solid and was recrystallized from n-hexane. It had a melting point of 49–50° C.

Analysis.—$C_{11}H_4Cl_2F_8N_2O_3$ (435.0): Cal.: 30.4% C, 0.92% H, 6.44% N. Found: 31.0% C, 0.9% H, 6.4% N.

EXAMPLE 2

2,5-di-(trifluoromethyl)-4-nitro-trifluoroacetanilide

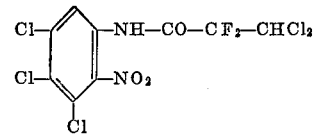

27.4 grams (0.1 mole) of 2-nitro-5-amino-hexafluoro-p-xylene in 200 milliliters of dried toluene were mixed with 2 milliliters of trifluoroacetic acid and, while stirring, 15.4 milliliters (0.11 mole) of trifluoroacetic anhydride were dropped in. The reaction mixture was refluxed for 4 hours, then concentrated and the residue was crystallized from petroleum ether boiling at 80–110° C.

Yield 22.3 grams (60%), melting point 71–73° C.
Analysis.—$C_{10}H_3F_9N_2O_3$ (370): Cal.: 32.4% C, 0.81% H, 7.56% N. Found: 32.8% C, 1.0% H, 7.2% N.

EXAMPLE 3

2-nitro-3,4,5-trichloro-(α,α-difluoro-β,β-dichloro)propionanilide

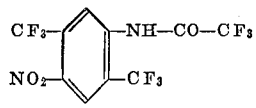

482.0 grams (1.35 moles) of 3,4,5-trichloro-(α,α-difluoro-β,β-dichloro)-propionanilide (prepared as described in Example 1) was introduced into 14,000 milliliters of concentrated sulfuric acid and, over a period of 6 hours, 136.1 grams (1.35 moles) of potassium nitrate were added in portions, whereby the temperature in the reaction vessel rose to 32° C. The reaction mixture was stirred for 9 hours and then allowed to stand for 24 hours at room temperature. Subsequently, the reaction mixture was stirred into a mixture of ice and water, the solid matter was separated by suction filtration, washed with water until neutral and dried.

Yield 500 grams (92%) melting point 96–98° C.
Analysis.—$C_9H_3Cl_5F_2N_2O_3$ (402.5): Cal.: 26.8% C, 0.75% H, 6.96% N. Found: 27.3% C, 0.6% H, 6.7% N.

In the following Table I compounds are listed which were prepared in a manner analogous to that described in Examples 1, 2, and 3.

TABLE I

Examples 4–26

| Example No. | Chemical designation | Mode of preparation according to Example— | Yield percent | Melting point, °C. | Empirical formula (molecular weight), analysis values in percent |
|---|---|---|---|---|---|
| 4 | 2,5-di-trifluoromethyl-4-nitro-trichloroacetanilide (IV) | 2 | 73 | [1] 0.5 136–139 | $C_{10}H_3Cl_3F_6N_2O_3$ (419.5) Cal'd: 28.62 C, 0.71 H, 6.68 N Found: 28.4 C, 0.8 H, 6.8 N |
| 5 | 2,5-di-trifluoromethyl-4-nitro-dibromoacetanilide (V) | 2 | 70 | 131–133 | $C_{10}H_4Br_2F_6N_2O_3$ (473.8) Cal'd: 25.4 C, 0.84 H, 5.92 N Found: 25.1 C, 0.91 H, 6.01 N |
| 6 | 2-nitro-3,4,5-trichlorotrifluoroacetanilide (VI) | 2 and 3 | 70 | 142–143 | $C_8H_2Cl_3F_3N_2O_3$ (337.5) Cal'd: 28.5 C, 0.59 H, 8.31 N Found: 28.8 C, 0.3 H, 8.6 N |
| 7 | 2-nitro-3,4,5-trichlorotrichloro-acetanilide (VII) | 2 and 3 | 82 | 112 | $C_8H_2Cl_6N_2O_3$ (387) Cal'd: 24.8 C, 0.52 H, 7.24 N Found: 25.2 C, 0.8 H, 7.2 N |
| 8 | 2-nitro-3,4,6-trichlorotrifluoroacetanilide (VIII) | 2 and 3 | 69 | 127–128 | $C_8H_2Cl_3F_3N_2O_3$ (337.5) Cal'd: 28.5 C, 0.59 H, 8.31 N Found: 28.6 C, 0.7 H, 8.0 N |
| 9 | 2-nitro-3,4,6-trichlorotrichloro-acetanilide (IX) | 2 and 3 | 89 | 105 | $C_8H_2Cl_6N_2O_3$ (387) Cal'd: 24.8 C, 0.52 H, 7.24 N Found: 24.8 C, 0.8 H, 7.3 N |
| 10 | 2-cyano-4-nitro-(α,α-difluoro-β,β-dichloro)-propionanilide (X) | 1 | 93 | 130–131 | $C_{10}H_5Cl_2F_2N_3O_3$ (324.0) Cal'd: 37.0 C, 1.54 H, 12.95 N Found: 37.5 C, 1.6 H, 13.1 N |
| 11 | 2-cyano-4-nitro-trifluoroacetanilide (XI) | 2 | 62 | 122–124 | $C_9H_4N_3O_3F_3$ (259) Cal'd: 41.7 C, 1.54 H, 16.2 N Found: 41.7 C, 1.5 H, 16.1 N |
| 12 | 2-cyano-4-nitro-trichloroacetanilide (XII) | 2 | 54 | 128–130 | $C_9H_4Cl_3N_3O_3$ (308.5) Cal'd: 35.0 C, 1.29 H, 13.6 N Found: 35.2 C, 1.2 H, 13.7 N |

See footnote at end of table.

TABLE I—Continued

| Example No. | Chemical designation | Mode of preparation according to Example— | Yield percent | Melting point, °C. | Empirical formula (molecular weight), analysis values in percent |
|---|---|---|---|---|---|
| 13 | 2-fluoro-4-nitro-5-chloro-($\alpha,\alpha$-difluoro-$\beta,\beta$-dichloro)-propionanilide[1] (XIII). | 1 and 3 | 63 | 87–88 | $C_9H_4Cl_3F_2N_2O_3$ (351.3)<br>Cal'd: 30.7 C, 1.13 H, 8.0 N<br>Found: 30.4 C, 1.2 H, 8.1 N |
| 14 | 2-fluoro-4-nitro-5-chlorotrifluoroacetanilide (XIV) | 2 and 3 | 50 | 89 | $C_8H_3ClF_4N_2O_3$ (286.5)<br>Cal'd: 33.48 C, 1.05 H, 9.78 N<br>Found: 33.8 C, 1.1 H, 9.7 N |
| 15 | 2-fluoro-4-nitro-5-chlorotrichloroacetanilide (XV) | 2 and 3 | 50 | | $C_8H_3Cl_4FN_2O_3$ (336.0)<br>Cal'd: 28.6 C, 0.89 H, 8.34 N<br>Found: 28.45 C, 0.87 H, 8.39 N |
| 16 | 2-nitro-3,5-di-trifluoromethyl-($\alpha,\alpha$-difluoro-$\beta,\beta$-dichloro)-propionanilide (XVI). | 1 | 62 | 66–68 | $C_{11}H_4Cl_2F_8N_2O_3$ (435)<br>Cal'd: 30.3 C, 0.92 H, 6.45 N<br>Found: 30.6 C, 1.5 H, 6.8 N |
| 17 | 2-nitro-3,5-di-trifluorotrifluoroacetanilide (XVIII) | 2 | 81 | 142–144 | $C_{10}H_3F_9N_2O_3$ (370)<br>Cal'd: 32.45 C, 0.81 H, 7.56 N<br>Found: 32.2 C, 1.3 H, 7.4 N |
| 18 | 2-nitro-3,5-di-trifluoromethyl-trichloroacetanilide (XVIII) | 1 | 63 | 64–66 | $C_{10}H_3Cl_3F_6N_2O_3$ (419.5)<br>Cal'd: 28.6 C, 0.71 H, 6.68 N<br>Found: 28.4 C, 0.9 H, 6.7 N |
| 19 | 2,3,6-trichloro-5-trifluoromethyl-trichloroacetanilide (XIX) | 2 | 63 | 119–120 | $C_9H_2Cl_6F_3N_2O$ (410)<br>Cal'd: 26.3 C, 0.48 H, 3.4 N, 52.0 Cl<br>Found: 26.4 C, 0.5 H, 3.3 N, 52.4 Cl |
| 20 | 2,4,6-trichloro-3-nitrotrichloroacetanilide (XX) | 2 and 3 | | 139–140 | $C_8H_2Cl_6N_2O_3$ (387)<br>Cal'd: 24.8 C, 0.52 H, 7.24 N<br>Found: 24.7 C, 0.7 H, 7.2 N |
| 21 | 2,4,6-trichloro-3-nitro-($\alpha,\alpha$-difluoro-$\beta,\beta$-dichloro)-propionanilide (XXI). | 1 and 2 | 89 | 140–141 | $C_9H_3Cl_5F_2N_2O_3$ (402.5)<br>Cal'd: 26.8 C, 0.75 H, 6.96 N<br>Found: 27.2 C, 0.9 H, 7.0 N |
| 22 | 2,3,6-trichloro-4-nitrotrichloroacetanilide (XXII) | 2 | 64 | 130–131 | $C_8H_2Cl_6N_2O_3$ (387)<br>Cal'd: 24.8 C, 0.52 H, 7.27 N<br>Found: 25.2 C, 0.6 H, 7.2 N |
| 23 | 2-nitro-4-cyano-($\alpha,\alpha$-difluoro-$\beta,\beta$-dichloro)-propionanilide (XXIII). | 1 | 61 | 72–74 | $C_{10}H_5Cl_2F_2N_3O_3$ (324)<br>Cal'd: 37.0 C, 1.54 H, 12.95 N<br>Found: 37.5 C, 1.6 H, 13.3 N |
| 24 | 2,4,6-tribromo-3-nitro-($\alpha,\alpha$-difluoro-$\beta,\beta$-dichloro)-propionanilide (XXIV). | 1 | 11.3 | 177 | $C_9H_2Br_3Cl_2F_2N_2O_3$ (534.7)<br>Cal'd: 20.2 C, 0.37 H, 5.23 N<br>Found: 21.1 C, 0.6 H, 5.4 N |
| 25 | 2-nitro-3,4,6-trichloro-($\alpha,\alpha$-difluoro-$\beta,\beta$-dichloropropionanilide (XXV). | 1 and 3 | 75 | 110 | $C_9H_3Cl_5F_2N_2O_3$ (402.5)<br>Cal'd: 26.8 C, 0.75 H, 6.96 N<br>Found: 27.4 C, 0.8 H, 7.3 N |
| 26 | 3,5-di-(trifluoromethyl)-4-nitro-($\alpha,\alpha$-difluoro-$\beta,\beta$-dichloropropionanilide (XXVI). | 1 | 55 | 126–127 | $C_{11}H_4Cl_2F_8N_2O_3$ (435.0)<br>Cal'd: 30.3 C, 0.92 H, 6.44 N<br>Found: 30.3 C, 1.0 H, 5.9 N |

[1] Preparation of aniline: G. C. Finger, F. W. Kruse, J.A.C.S., 78, 6034 (1956); G. C. Finger, et al., J.A.C.S., 81, 94–101 (1959).

EXAMPLE 27

Seeds of different types of weeds and crop plants were sown in pots filled with loamy soil and covered with a layer of soil about 1 cm. thick. On the day of sowing the surface of the soil was sprayed with suspension of wettable powders containing as active ingredient Compounds I or X, respectively (cf. Examples 1 and 10). The wettable powders had the composition specified in the paragraph preceding the examples.

This method is called pre-emergence process. The amount of liquid applied was 800 liters, calculated on 1 hectare. The pots were placed in a greenhouse and the result was evaluated after 4 weeks.

In the following tables the damage is indicated in percent, 100 corresponding to complete killing and 0 to no damage at all. The remark "damage" in some of the tables indicates that the respective active ingredient caused severe damage of the treated crop plants so that an application of this herbicide cannot be considered successful in the respective crop.

As comparative compound, the chemically closely related 3,4-dichloropropionanilide (propanil) known in practice was used, which is well tolerated by many crop plants.

TABLE A

Effect against weeds and crop plants in the pre-emergence process with 0.12 g. of active ingredient per square meter of soil surface

| Type of plant | Propanil | Compound I | Compound X |
|---|---|---|---|
| Weeds: | | | |
| Sinapis arvensis | 30 | 100 | 95 |
| Ipomoea purpurea | 0 | 100 | 95 |
| Echinochloa crus-galli | 0 | 95 | 100 |
| Poa annua | 0 | 100 | 90 |
| Anthemis arvensis | 40 | 95 | 95 |
| Stellaria media | 25 | 95 | 100 |
| Amaranthus retroflexus | 45 | 95 | 100 |
| Eleusine indica | 0 | 100 | 95 |
| Leptochloa dubia | 0 | 95 | 95 |
| Crop plants: | | | |
| Gossypium hirsutum (cotton) | 0 | 0 | 0 |
| Helianthus annuus (sunflower) | 0 | 10 | (¹) |
| Lycopersicum esculentum (tomato plant) | 0 | 10 | 10 |
| Brassica oleracea (cabbage plant) | 0 | 0 | 10 |
| Pisum sativum (pea) | 0 | (¹) | 0 |
| Vicia faba (horse bean) | 0 | (¹) | 10 |
| Phaseoulus vulgaris (dwarf kidney bean) | 0 | (¹) | 10 |
| Zea mays (maize) | 0 | (¹) | 0 |
| Sorghum vulgare (millet) | 0 | (¹) | 15 |
| Arachis hypogaea (peanut) | 0 | (¹) | 0 |
| Nocotiana tabacum (tobacco plant) | 0 | (¹) | 0 |
| Apium graveolens (celery pant) | 0 | (¹) | 0 |

[1] Damage.

The table shows that in a concentration of 0.12 gram of active ingredient per square meter of soil surface the comparative compound propanil had practically no effect on weeds, whereas the two compounds according to the invention surprisingly had a very broad effect on weeds, i.e. they controlled dicotyledons such as Sinapis, Ipomoea, Anthemis, Stellaria and Amaranthus as well as monocotyledons such as Poa, Echinochloa, Eleusine and Leptochloa.

This broad herbicidal effect is of advantage because in practice the natural weed flora is partially controlled only when preparations of the same type are frequently used. For example, with the application of triazine derivatives, broad leafed (dicotyledonous) weeds are destroyed while gramineous weeds such as Echinochloa, Leptochloa or Eleusine survive and spread, whereas preparations on the basis of nitroanilines, for example 2,6-dinitro-4-trifluoromethyl-N,N-dipropylaniline (trifluralin) have a very good effect on gramineous weeds but do practically no harm to dicotyledons such as Ipomoea.

As compared therewith, the novel compounds according to the invention control the two types of weeds with equally good effect. The reactions of the treated plants already show in the stage of germination, i.e. the plants die before they pierce the surface of the soil.

Compound I did but little harm, if any, only to cotton, sunflower, tomato and cabbage, while Compound II did not harm or little harm only to cotton, tomato, cabbage, pea, horse bean, dwarf bean, maize, millet, peanut, tobacco and celery.

EXAMPLE 28

Compounds XVI and XXV were compared with propanil with respect to their effect in the same manner as described in Example 27. The compounds were applied in the form of an aqueous suspension of wettable powder and the results were evaluated after 4 weeks. The results are indicated in the following Table B:

a broad spectrum herbicidal effect was obtained since gramineous weeds, for example Echinochloa, Poa, Eleusine, Leptochloa and Alopecurus, as well as broad leaf weeds such as Amaranthus, Stellaria and Chenopodium, were attacked and strongly damaged or even fully destroyed. Simultaneously, no damage was observed in the maize. The comparative compound propanil had practically no effect on the weeds.

EXAMPLE 29

In many countries the distribution of *Cyperus rotundus*, a perennial weed forming in the soil a branched system of roots and runners and growing tubers at a certain time of the year which survive in the soil for a very long period of time, sets a special problem. Even if the roots of the plant have died long ago, the tubers may sprout again. Two of the compounds mentioned in the preceding examples exhibit a good effect in this respect in that they prevent the tubers from sprouting (cf. Table C).

TABLE C

Effect against *Cyperus rotundus* in the pre-emergence method. Application of the compounds in the form of suspensions of wettable powders as described in Example 27

|  | XVI | | I | |
|---|---|---|---|---|
| Propanil, 1.0 g./m.² | 1.0 g./m.² | 0.5 g./m.² | 1.0 g./m.² | 0.5 g./m.² |
| 0 | 100 | 90 | 100 | 90 |

EXAMPLE 30

Post-emergence process

A series of weeds were sown as described in Example 27 and the post were placed in the greenhouse. Two to three weeks after sowing the grown plants were sprayed with aqueous suspensions of wettable powders of Compounds X, XIII, I and III until dripping from the leaves set in. Propanil was used as comparative compound in these example, too. The results were evaluated 2 weeks after the treatment and are summarized in the following Table D.

TABLE D

| Type of plant | Propanil | | X | | XIII | | I | | III | |
|---|---|---|---|---|---|---|---|---|---|---|
| | 0.06 | 0.12 | 0.06 | 0.12 | 0.06 | 0.12 | 0.06 | 0.12 | 0.06 | 0.12 |
| Weeds: | | | | | | | | | | |
| Sinapis arvensis | 80 | 100 | 95 | 100 | 100 | 100 | 100 | 100 | 100 | 100 |
| Ipomoea purpurea | 50 | 90 | 70 | 80 | 80 | 95 | 50 | 75 | 75 | 85 |
| Galium aparine | 40 | 80 | 30 | 50 | 95 | 100 | 55 | 75 | 85 | 90 |
| Poa annua | 30 | 60 | 80 | 90 | 40 | 80 | 50 | 60 | 60 | 70 |
| Anthemis arvensis | 10 | 20 | 95 | 100 | 95 | 100 | 100 | 100 | 100 | 100 |
| Viola tricolor | 25 | 30 | 85 | 95 | 80 | 90 | 90 | 100 | 90 | 95 |
| Portulaca oleracea | 65 | 75 | 80 | 90 | 90 | 100 | 100 | 100 | 100 | 100 |
| Chenopodium album | 90 | 100 | 80 | 95 | 100 | 100 | 100 | 100 | 100 | 100 |
| Chrysanthemum segetum | 40 | 50 | 100 | 100 | 95 | 100 | 90 | 95 | 100 | 100 |
| Average effect on weeds, percent | 47.8 | 67.2 | 79.4 | 88.9 | 86.1 | 96.1 | 81.7 | 89.4 | 88.9 | 93.3 |
| Crop plants: | | | | | | | | | | |
| Triticum aestivum (wheat) | 20 | 30 | 10 | 20 | 0 | 0 | 0 | 20 | 0 | 10 |
| Hordeum distichum (barley) | 15 | 20 | 0 | 20 | 0 | 10 | 0 | 15 | 0 | 10 |
| Avena sativa (oat) | 15 | 30 | 0 | 10 | 0 | 10 | 0 | 10 | 0 | 15 |
| Zea mays (maize) | 30 | Damage | 0 | 5 | 0 | 10 | Damage | | Damage | |
| Sorghum vulgare (millet) | 20 | Damage | 0 | 15 | 0 | 0 | Damage | | Damage | |
| Oryza sativa (rice) | 0 | 0 | 0 | 10 | 0 | 0 | 0 | 15 | 10 | 15 |
| Arachis hypogaea (peanuts) | 10 | 30 | 10 | 10 | 0 | 15 | Damage | | Damage | |
| Medicago sativa (lucern) | Damage | | 10 | 15 | 0 | 15 | Damage | | Damage | |
| Pisum sativum (pea) | Damage | | 0 | 0 | 10 | 15 | Damage | | Damage | |
| Glycine soja (soybean) | Damage | | Damage | | 0 | 10 | Damage | | Damage | |
| Phaseolus vulgaris (dwarf bean) | 30 | Damage | Damage | | 0 | 10 | Damage | | Damage | |
| Gossypium hirsutum (cotton) | Damage | | 0 | 10 | 0 | 0 | Damage | | Damage | |
| Allium cepa (onion) | Damage | | Damage | | 0 | 10 | Damage | | Damage | |
| Nicotiana tabacum (tobacco) | 20 | Damage | Damage | | 10 | 15 | 0 | 10 | Damage | |
| Daucus carota (carrot) | Damage | | Damage | | 0 | 10 | 10 | 20 | Damage | |

TABLE B

Effect against weeds and crop plants in the pre-emergence method with 0.25 gram of active ingredient per square meter of soil surface

| Type of plant | Propanil | XVI | XXV |
|---|---|---|---|
| Weeds: | | | |
| Echinochloa crus-galli | 0 | 95 | 85 |
| Poa annua | 0 | 95 | 95 |
| Eleusine indica | 10 | 100 | 100 |
| Leptochloa dubia | 0 | 100 | 100 |
| Alopecurus myosuroides | 20 | 90 | 75 |
| Amaranthus retroflexus | 50 | 90 | 100 |
| Stellaria media | 35 | 100 | 100 |
| Chenopodium album | 25 | 100 | 95 |
| Crop plants: Zea mays (maize) | 0 | 0 | 0 |

The above table reveals that the tested compounds are effective in the pre-emergence method. In this case, too, It can be seen that the herbicidal effect of the compounds of the invention was distinctly superior to that of propanil (cf. the indicated average values). Quite generally, the novel compounds have the advantage that they are effective or even very effective against *Athemis arvensis* and *Viola tricolor*, which remain practically undamaged by propanil.

A similar difference in favor of the novel compounds exists in the control of *Chrysanthemum segetum* and *Portluaca oleracea* against which propanil has no satisfactory effect. With respect to other types of weeds which are difficult to control, such a Galium or Ipomea, mainly Compound XIII has an advantageous effect. Simultaneously, the compounds of the invention do little harm, if any, only to cereals, such as barley, oat, and wheat.

The comparative propanil was not very harmful to the aforesaid cereals either, but the burnings caused therewith were always more distinct than those obtained with the novel compounds.

Moreover, Compound XIII could be used in a greater number of crop plants, namely in maize, millet, rice, peanut, lucern, pea, soybean, dwarf bean, cotton, onion, tobacco and carrot. The other 3 compounds likewise exhibited a selective effect in several crop plants. In the applied amounts, the comparative propanil did little harm, if any, only to some crops, but its herbicidal effect was too low.

Hence, it follows that the 4 compounds according to the invention are much more effective than propanil and that they have a wider range of application.

EXAMPLE 31

Post-emergence process

In the manner described in the preceding example Compound XXV was compared with propanil in a greater number of crop plants. For comparison there was further used dinoseb acetate (acetic acid ester of 2,4-dinitro-6-sec-butyl phenol) recommended as herbicide in cultivations of cereals and leguminosae.

TABLE E

Effect against weeds and crop plants in the post-emergence method with 0.25 g. of active ingredient per square meter of soil surface

| Type of plant | Dinoseb-acetate | Propanil | XXV |
|---|---|---|---|
| Weeds: | | | |
| Anthemis arvensis | 100 | 20 | 90 |
| Bidens pilosa | 90 | 100 | 100 |
| Chrysanthemum segetum | 95 | 60 | 100 |
| Datura stramonium | 95 | 85 | 100 |
| Mercurialis annua | 100 | 100 | 95 |
| Portulaca oleradea | 85 | 85 | 95 |
| Sinapis arvensis | 100 | 95 | 95 |
| Stellaria media | 100 | 100 | 100 |
| Viola tricolor | 20 | 60 | 100 |
| Average herbicidal effect, percent | 87.2 | 78.3 | 97.2 |
| Crop plants: | | | |
| Sorghum vulgare (millet) | 25 | 75 | 0 |
| Triticum aestivum (wheat) | 45 | 65 | 0 |
| Hordhum distichum (barley) | 40 | 60 | 0 |
| Phaseolus vulgaris (bean) | 45 | 65 | 10 |
| Pisum sativum (pea) | 20 | 55 | 20 |
| Vicia faba (horse bean) | 0 | 80 | 0 |

It should be noticed that the compound according to the invention had a distinctly better effect against Anthemis, Chrysanthemum and Viola than had propanil and that it did not damage crops of cereals and leguminosae. Compared with dinoseb acetate, a great difference could not be observed with most of the weeds, but against *Viola tricolor* the compound of the invention was fully effective, while the comparative compound had practically no effect. When dinoseb acetate was applied in a number of cultivations distinct burnings could be observed on the leaves. Thus, the novel compound had selectivity advantages in crops of millet, wheat, barley and bean.

In this connection, it should be noted that in the greenhouse test many herbicides distinctly damage crop plants when applied in an amount sufficient for a herbicidal effect, although the said herbicides may be well used in practice in these crops. This indicates that over-dosage, which often occurs in practice, may cause damage. Products, however, which do no harm to crop plants in the greenhouse when applied in the respective amounts are, in most cases, safer in their application even under very unfavorable conditions. Hence, it follows that in some crops Compound XXV is safer in its application than the known dinoseb acetate.

EXAMPLE 32

Post-emergence process

In the manner described in Example 30, barley, oat and wheat were sown in the field and after germination and as soon as the plants had developed 3 to 4 leaves the crops were treated with different doses of Compounds I, XIII, XXV and X, dinoseb acetate and propanil.

The results obtained 3 weeks after the treatment are summarized in the following Table F.

The results show that the compounds of the invention exhibit an excellent effect in the field and that they have a better effect against some weeds that are difficult to control than the comparative compounds, above all against *Polygonum persicaria, Polygonum aviculare,* Veronica sp., *Matricaria chamomilla* and *Agrostemma githago.*

TABLE F

Effect against weeds and crop plants in a post-emergence process in the field

| | 0.5 kg./ha. of active ingredient | | | | 1.0 kg./ha. of active ingredient | | | |
|---|---|---|---|---|---|---|---|---|
| Type of plant | I | XIII | Dinoseb-acetate | Propanil | XXV | X | Dinoseb-acetate | Propanil |
| Weeds: | | | | | | | | |
| Sinapis arvensis | 100 | 100 | 100 | 95 | 100 | 100 | 100 | 97.5 |
| Thlaspi arvense | 100 | 100 | 100 | 95 | 100 | 100 | 100 | 97.5 |
| Polygonum persicaria | 97.5 | 97.5 | 75 | 75 | 100 | 95 | 95 | 85 |
| Polygonum aviculare | 85 | 95 | 32.5 | 32.5 | 75 | 75 | 65 | 65 |
| Agrostemma githago | 100 | 100 | 90 | 0 | 95 | 95 | 95 | 0 |
| Veronica sp | 100 | 100 | 80 | 95 | 95 | 97.5 | 85 | 90 |
| Matricaria chamomilla | 95 | 95 | 75 | 32.5 | 95 | 95 | 85 | 65 |
| Crop plants: | | | | | | | | |
| Triticum aestivum | | | | | | | | |
| Hordeum distichum | Minor depressions at the beginning which rapidly disappear in the process of growth; no visible damage after 3 weeks. | | | | | | | |
| Avena sativa | | | | | | | | |

EXAMPLE 33

Post-emergence process

Compounds XIX, IX, VI, XX, and VIII were tested with respect to their herbicidal effect as described in Examples 30 and 31. The following results were obtained.

TABLE G

Effect against weeds and crop plants in the post-emergence process with 0.25 g. of active ingredient per square meter of soil surface

| Type of plant | Dinoseb-acetate | Propanil | XIX | IX | VI | XX | VIII |
|---|---|---|---|---|---|---|---|
| Weeds: | | | | | | | |
| Chenopodium album | 100 | 95 | 100 | 100 | 75 | 80 | 100 |
| Raphanus raphanistrum | 100 | 100 | 90 | 100 | 100 | 95 | 100 |
| Sinapis arvensis | 100 | 95 | 90 | 100 | 100 | 100 | 100 |
| Stellaria media | 100 | 100 | 100 | 100 | 100 | 100 | 100 |
| Mercurialis annua | 100 | 100 | 100 | 95 | 90 | 90 | 100 |
| Viola tricolor | 20 | 60 | 100 | 85 | 75 | 85 | 75 |
| Average herbicidal effect, percent | 86.7 | 91.7 | 96.7 | 96.7 | 90.0 | 91.7 | 91.2 |
| Crop plants: | | | | | | | |
| Triticum aestivum (wheat) | 40 | 60 | 0 | 0 | 0 | 0 | 10 |
| Hordeum distichum (barley) | 30 | 60 | 0 | 0 | 0 | 0 | 0 |
| Medicago sativa (lucern) | 60 | 60 | 0 | | 0 | 0 | 20 |
| Glycine max (soybean) | 40 | 95 | | | 0 | 0 | 0 |

The indicated values show that firstly the novel compounds are superior to the comparative compounds in their action against *Viola tricolor* and, secondly, all of them do less harm to barley and wheat and most of them have better sparing properties with respect to lucern and soybean than the comparative compounds.

EXAMPLE 34

Pre-emergence process

Compound XIX was compared in the manner described in Example 27 with the known herbicide propachlor (N-isopropyl-1′-chloroacetanilide) which has a specific effect against grasses. It was found, however, that its effect against the weedy grass Alopecurus as well as against a number of broad leaf weeds was unsatisfactory and that its degree of damage in wheat was too high.

TABLE H

Effect against weeds and crop plants in the pre-emergence process with 0.25 gram of active ingredient per square meter of soil surface

| Type of plant | XIX | Propachlor |
|---|---|---|
| Weeds: | | |
| Sinapis arvensis | 100 | 60 |
| Anthemis arvensis | 100 | 75 |
| Stellaria media | 100 | 80 |
| Chenopodium album | 100 | 30 |
| Datura stramonium | 100 | 20 |
| Alopecurus myosuroides | 95 | 70 |
| Crop plants: Triticum aestivum (wheat) | 0 | 50 |

It can be seen that the compound of the invention destroyed practically without difference all weeds without doing any harm to the wheat.

EXAMPLE 35

A method which is related to the pre-emergence process is the so-called presowing or preplant incorporation method. In the present case, this method was applied in such a manner that the seeds of crop plants and weeds were placed in pots as usual, the amount of preparation to be used was mixed with a small volume of soil, the seeds still lying open were covered with this soil so that from the beginning of germination they could take up the active ingredient from the covering soil. The test was evaluated after 4 weeks as usual. The result is indicated in the following Table J.

TABLE J

Effect against weeds and crop plants in the presowing incorporation method with 0.5 gram of active ingredient per square meter

| Type of plant | Propanil | XXII | XXIII |
|---|---|---|---|
| Weeds: | | | |
| Lolium multiflorum | 10 | 95 | 90 |
| Alopecurus myosuroides | 20 | 100 | 100 |
| Sinapis arvensis | 60 | 90 | 95 |
| Stellaria media | 50 | 95 | 100 |
| Crop plant: Triticum aestivum (wheat) | 0 | 0 | 0 |

The results show that in the soil treatment the chemically related propanil had an insufficient effect while the compounds of the invention were fully effective against the weeds and did not damage the wheat. Additionally, one of the novel Compounds XXIII exhibited a considerable effect in the leaf treatment (post-emergence process cf. Example 30) above all against Sinapis, Stellaria, Chenopodium, Ipomoea, and Amaranthus. The dosage to ensure a sufficient control of the weeds was 0.12 gram of active ingredient per square meter of surface.

What is claimed is:

1. A halocarboxylic acid anilide of the formula

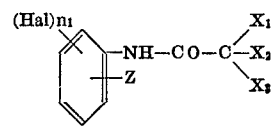

in which $X_1$ and $X_2$ represent fluorine
$X_3$ stands for $CHCl_2$
$Z$ is $NO_2$
Hal represents identical chloro groups and
$n_1$ is 3.

2. The compound of claim 1 wherein the same is 2-nitro - 3,4,5 - trichloro-($\alpha,\alpha$-difluoro-$\beta,\beta$-dichloro)-propionanilide.

3. The compound of claim 1 wherein the same is 2,4,6-trichloro - 3 - nitro-($\alpha,\alpha$-difluoro-$\beta,\beta$-dichloro)-propionanilide.

4. The compound of claim 1 wherein the same is 2-nitro - 3,4,6 - trichloro-($\alpha,\alpha$-difluoro-$\beta,\beta$-dichloropropionanilide.

References Cited

UNITED STATES PATENTS

| | | | |
|---|---|---|---|
| 3,407,056 | 10/1968 | Schwartz | 260—562 |
| 3,405,176 | 10/1968 | Farah et al. | 260—562 |
| 3,426,049 | 2/1969 | Baker | 260—562 |
| 2,904,590 | 9/1959 | Oxley et al. | 260—562 |
| 2,949,354 | 8/1960 | Todd | 71—118 |
| 3,681,376 | 8/1972 | Scherer et al. | 260—562 |
| 3,197,503 | 7/1965 | Smith et al. | 260—562 |

FOREIGN PATENTS

| | | | |
|---|---|---|---|
| 1,372,475 | 8/1964 | France | 260—562 |
| 28,484 | 11/1969 | Japan | 260—562 |
| 29,476 | 12/1969 | Japan | 260—562 |

(Other references on following page)

OTHER REFERENCES

Forbes et al., J. Chem. Soc., pp. 835–39 (1963).
Bishop et al., J. Chem. Soc., pp. 3076–80 (1964).
Baruffini et al., Chem. Abstracts, vol. 68, item 77872 (1968).
Berti et al., Chem. Abst., vol. 48, col. 4456f–i (1954).
Pettit et al., Chem. Abst., vol. 49, col. 10286g–10287b (1956).
Nagasawa et al., Chem. Abst., vol. 52, col. 12310e–f (1958).
Fernandez-Bolanos et al., Chem. Abst., vol. 55, col. 3560b–3561h (1961).
Fukui et al., Chem. Abst., vol. 54, col. 4430b–4431b (1960).
Suetkin, Chem. Abst., vol. 60, col. 1621d–e (1964).
Sita, Chem. Abst., vol. 65, col. 4463c (1966).
Khaskin et al., Soviet Plant Physiology, vol. 13, pp. 797–801 (September 1966).
Shomova et al., Microbiology U.S.S.R., vol. 34, pp. 617–620 (July 1965).
Baruffini et al. II, Farmaco, Ed. Sci., vol. 22, pp. 612–26 (1967).
Prokopvich et al., Farmakol. Toksikol. (Kiev), pp. 80–84 (1970).

HARRY I. MOATZ, Primary Examiner

U.S. Cl. X.R.

71—105; 118; 260—465 D